Figure 3:
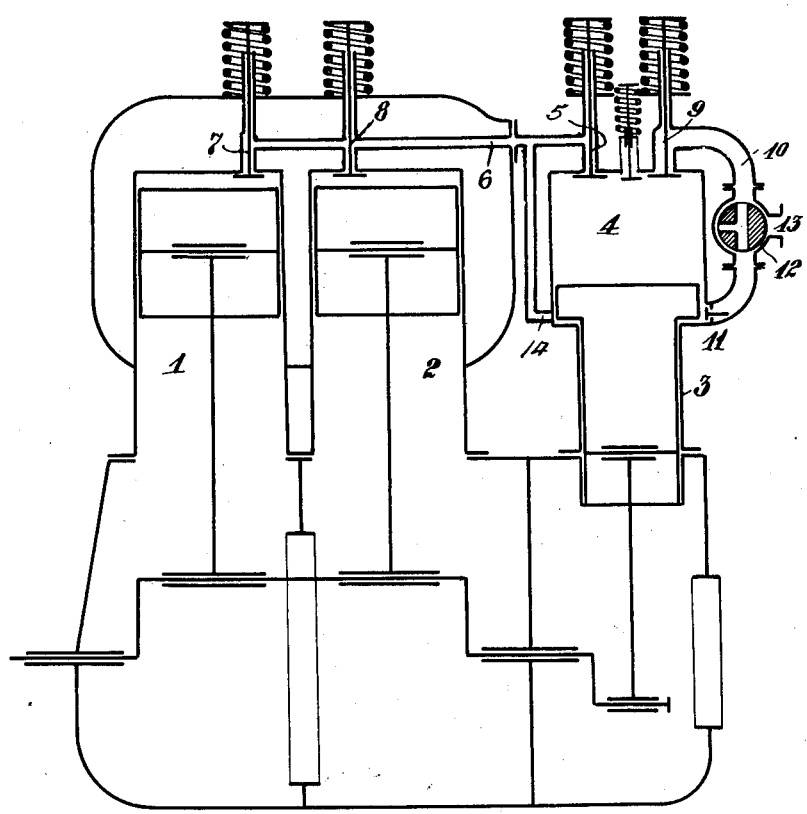

July 5, 1927. 1,634,468
F. MÜLLER
FOUR-CYCLE INTERNAL COMBUSTION ENGINE WORKING
WITH AN INJECTION AIR COMPRESSOR
Filed Aug. 9, 1921   2 Sheets-Sheet 1
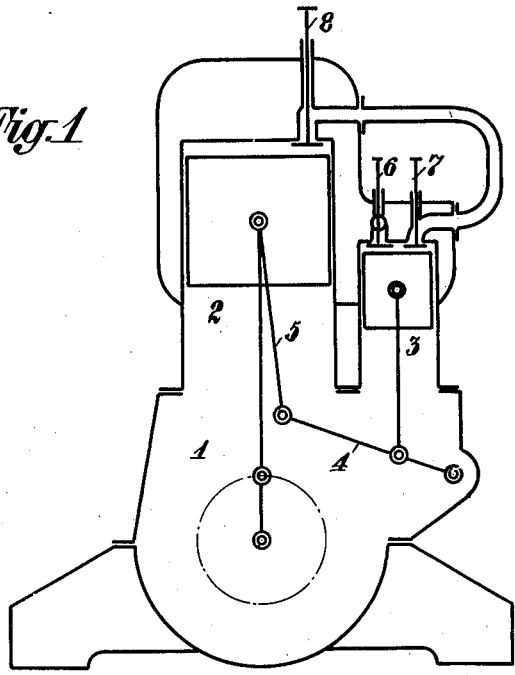
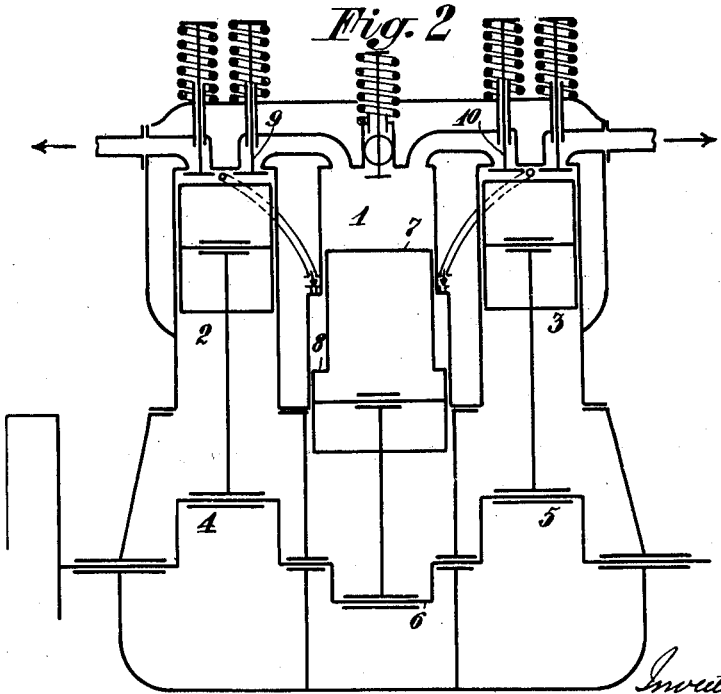

Patented July 5, 1927

1,634,468

UNITED STATES PATENT OFFICE.

FRIEDRICH MÜLLER, OF VIENNA, AUSTRIA.

FOUR-CYCLE INTERNAL-COMBUSTION ENGINE WORKING WITH AN INJECTION AIR COMPRESSOR.

Application filed August 9, 1921, Serial No. 491,006, and in Austria July 3, 1917.

(GRANTED UNDER THE PROVISIONS OF THE ACT OF MARCH 3, 1921, 41 STAT. L., 1313.)

The present invention relates to four-stroke cycle internal combustion engines, which work with fuel injection and are provided with compressors for producing the fuel injection air. The object of the invention is to give the working cylinders of such four-stroke cycle engines a greater charge than corresponds to the suction volume of the working cylinders. The invention consists in this, that the injection air compressor delivers at each compression stroke alternately the injection air required for one combustion and the additional air required for a working cycle or, when formed as a step compressor, the injection air for one combustion with the piston step and the whole or additional charging air for a working cycle with the piston base. The advantages of such a working process reside in the fact, that it is carried out with the aid of the injection air compressor, which is already provided on the engine and that it is not necessary to fit special auxiliary pumps, which would add to the cost of the engine. The movements of the compressor and working cylinder piston can easily be so co-ordinated that, when charging the working cylinders, the charging pump will work at the greatest efficiency.

The working cylinders and the compressor coact in the best manner if, with the compressor piston in one dead centre, either the injection medium or the entire charging medium or the additional charging medium is transferred into the working cylinder. The transfer can be effected, according as the compressor piston is constructed as a single or double acting piston and as a single-step or multi-step piston, at the inner or outer dead centre just as appears to be required by the working process, by the number of cylinders and the position of the crank. Naturally, not the beginning, but the end of the transfer coincides with the dead centre position of the compressor. The position of the crank at the commencement of the transfer corresponds preferably to the pressure of the injection or charging medium, which exists at the commencement of the transfer in the working cylinder or in the storage vessels for the injection or charging medium.

The accompanying drawing illustrates the invention by three constructional examples, Figure 1 showing a single cylinder engine with a single-step compressor, which delivers the additional quantity of charging air for the working cylinder.

Figure 2 a two-cylinder engine with a step compressor located in the middle between the two working cylinders, which delivers the total quantity of charging air for the working cylinders, the charging strokes of the same being controlled by the suction valves of the engine and Figure 3 a two-cylinder engine with a step compressor located at the end of the engine, the compressor being so constructed that the charging air chamber can act as the low pressure cylinder of the injection air step.

In Figure 1, 1 is the crank casing, 2 the working cylinder and 3 the compressor cylinder. The compressor produces the injection air and the additional part of the charging air alternately during two successive compression strokes and is driven by a rocker 4 and a connecting rod 5. The compressor air is sucked in through the valve 6 to the place of injection and is delivered through a valve 7 to the charging air pipe. The injection air compression stroke of the compressor coincides in point of time with the compression stroke and the charging air compression stroke with the exhaust stroke of the engine. That part of the charging air corresponding to the suction volume is sucked in during the suction period by the working cylinder itself and the additional part flows across at the commencement of the compression stroke through the valve 8 out of the charging air pipe and gives an additional filling to the working cylinder.

To each working stroke of the four-stroke cycle engine there correspond two compressor compression strokes. At the first compressor compression stroke the additional charging medium is transferred to the working cylinder and at the second compressor compression the injection medium. The additional charging medium is first transferred into the pipe between the valves 7 and 8, which acts as a receiver. At the commencement of the compression stroke it flows into the working cylinder. The commencement of the transfer of the charging medium into the pipe acting as a receiver depends on the pressure of the charging medium remaining in the pipe from the previous overcharge. The capacity of the pipe is preferably chosen of such a size that during the transfer into the receiver no dangerous differences of pressure will occur. The transfer from the receiver to the working cylinder takes place immediately after the end of the suction period of the working cylinder at the commencement of the compression stroke. The over-pressure remaining in the receiver after the transfer should in practice be no greater than about 0.5 atmosphere. The greatest pressure in the compression cylinder during the charging stroke will then not be substantially higher than about 0.5 atmosphere. On the injection air compression stroke following the charging compression stroke taking place the compression pressure of the compressor will naturally be higher than the final compression pressure in the working cylinder. The piston position of the compressor at the commencement of the transfer of the injection medium corresponds to the highest pressure of the injection medium.

In place of the valve 8 the suction valve or the injection valve of the engine can be used. For this purpose it would be necessary for the valves to be fitted with suitable seats or with two plates and be controlled in such a manner that the flow of the additional charging air shall take place at the correct moment.

In the two-cylinder engine shown in Figure 2 the compressor 1 is located in the middle between the two working cylinders 2 and 3. The working cranks 4 and 5 are rotated in the same direction, while the compressor crank 6 runs in the opposite direction to the working cranks. The compressor piston is formed in steps and reduces by means of its greater surface 7 the whole of the charging air and by means of the smaller stop surface 8 the injection air. The charging medium is transferred during one compression stroke into the cylinder 2 and during the other compression stroke into the cylinder 3. The transfer commences when the compressor piston is at its lower dead centre and ends when the piston is in the upper dead centre. At the commencement of the transfer there is atmospheric pressure in the compressor cylinder and at the end of the transfer a higher pressure corresponding to the greater stroke volume of the compressor. As each suction stroke of the working cylinder coincides with a compression stroke of the compressor, the suction valves 9 and 10 of the engine can be used simultaneously for controlling the charging air compression strokes.

The charging air is transferred directly during the suction period into the working cylinder and is at a pressure above atmospheric pressure at the end of the suction strokes. This pressure is greater the greater the ratio of the compression stroke volume is to the suction volume of the working cylinder.

The stroke volume of the compressor step, which produces the charging air, should be so determined that the weight of the charging air becomes greater than the weight of the air corresponding to the suction volume of one working cylinder.

In the two-cylinder engine shown in Figure 3 with the working cylinders 1 and 2 and the step compressor 3, the end surface of the piston of which produces the additional charging air and the step surface, the injection compression medium the cylinders are only additionally filled with charging air. In each two successive compression strokes the additional charging air passes in one case into the working cylinder 1 and in the other case into the working cylinder 2. This occurs after the closing of the suction valve of that working cylinder which is being charged with additional air and takes place preferably during the first part of the compression stroke. The pipe 6, through which this air flows, acts in this case as a receiver. The charging medium commences to pass into the receiver when the crank of the compressor is in the position, in which the pressure in the compressor cylinder is equal to the pressure in the receiver, and the passage of the air is completed when the compressor piston is in its upper dead centre position. The additional air is produced in the pumping chamber 4 and is transferred through the valve 5 into the pipe 6. At the end of the corresponding suction period, either valve 7 or 8 will open and the additional air will pass at the commencement of the compression strokes into the working cylinder.

The pump chamber 4 can be connected by a valve 9 and a pipe 10 to the pump chamber 11, so that the additional charging air space can also act as the low pressure cylinder of the injection air step. In the connecting pipe a three-way cock 12 or the like is fitted, which in the position shown connects the charging step and the injection air step of the compressor and, when turned through 90° in the clock-wise direction, can put the additional charging pump out of action, whereupon the sucked in additional air passes, instead of the pipe 6, through the connecting pipe 10 and the short pipe 13 into the atmosphere.

The capacity of the pipe 6 must always be of such dimensions that, on the charging air passing through it, no dangerous increases of pressure can occur. A receiver is preferably introduced into this pipe, which prevents the compression pressures occurring during the charging becoming substantially greater than in the working cylinder.

While, in those cases in which the compressor only transfers the additional part of the charging air, besides the injection air step, a charging air step may be provided, it is as a rule sufficient to use a single pressure step, which in two successive compression strokes delivers alternately the injection air and the additional charging air. The transfer can take place at the end of the suction stroke or during the compression stroke of the engine. For this purpose besides the normal compressor suction and compression valves, an additional valve is provided, which is placed at the inlet of the charging air into the working cylinder and which acts as a back pressure valve.

Having now particularly described and ascertained the nature of my said invention and in what manner the same is to be performed, I declare that what I claim is:—

1. In a four cycle engine, including a working cylinder, means including a single compressor actuated by said cylinder, for compressing and delivering charging air and injection air at different times during each cycle and during separate operations of said compressor.

2. In a four cycle engine including a working cylinder, means including a compressor operating in conjunction therewith for compressing and delivering charging air into said cylinder during each suction stroke and separately compressing and delivering injection air into said cylinder during its compression stroke.

3. In a four cycle engine, a working cylinder and an air compressor arranged to perform two delivery strokes during each cycle of the working cylinder, and means for delivering charging air to the working cylinder at one of said strokes and separately delivering injection air to the cylinder at another stroke.

4. In a four cycle engine comprising a working cylinder, means for delivering charging and injection air thereto including a compressor cylinder in which the charging air and the injection air are compressed separately from one another.

5. A four cycle engine comprising a working cylinder and a step compressor in which charging and injection air for said cylinder are compressed in different steps.

6. In a four stroke cycle internal combustion engine, the combination of a working cylinder and a step compressor adapted to compress injection air and separately therefrom charging air, the injection air and the charging air being compressed in different spaces of the compressor cylinder and means for delivery of the injection air and the charging air at different times into the working cylinder.

Vienna, Austria, July 18, 1921.

FRIEDRICH MÜLLER.